United States Patent [19]

Fox et al.

[11] Patent Number: 4,985,146
[45] Date of Patent: Jan. 15, 1991

[54] FILTERING SYSTEM

[75] Inventors: Robert J. Fox, Bowling Green; Merlin P. Hoodlebrink, Bradner, both of Ohio

[73] Assignee: Clarmatic Industries, Inc., Pemberville, Ohio

[21] Appl. No.: 461,731

[22] Filed: Jan. 8, 1990

[51] Int. Cl.$^5$ ............................................. B01D 21/02
[52] U.S. Cl. ..................................... 210/413; 210/298
[58] Field of Search ................ 210/107, 241, 249–251, 210/355, 298, 413

[56] References Cited

U.S. PATENT DOCUMENTS 4,673,502 6/1987 Fox ..................................... 210/413

Primary Examiner—Bernard Nozick
Attorney, Agent, or Firm—Allen D. Gutchess, Jr.

[57] ABSTRACT

A filtering system includes a filter drum assembly. The system includes a filter tank with a conveyor in the bottom which removes contaminants from liquid in the tank. The filter tank also has supports therein by means of which the filter drum assembly is removably supported in the tank and can be removed as a single assembly. The filter drum assembly includes a filtering drum located in the tank and supported by a suction pipe connected by a separable fitting to a suction pump. A drive shaft is vertically positioned above the drum and is rotatably supported by an end wall of the drum. The shaft drives a wiper arm having a wiper blade in contact with the filtering drum wall and the blade is periodically moved around the drum wall to clean filter cake therefrom. The wiper arm is driven by a one-way clutch, an arm, and a fluid-operated ram which is also supported by the suction pipe. There are no flexible seals between the filtering drum and other components nor any seals between components which move relative to one another. The filter drum assembly can be removed from the tank simply by disconnecting the suction pipe and a supply line for the fluid-operated ram.

18 Claims, 2 Drawing Sheets

FILTERING SYSTEM

This invention relates to a filtering system with a filtering drum assembly.

Filtering systems employing filtering drums are well known in the art. Filtering drums are located in a filter tank containing liquid from which contaminants are to be removed. Suction in the filtering drum draws contaminated liquid through walls thereof with a filter cake built up on the outer surface of the drum. The filter cake is periodically scraped off, usually by rotating the drum in contact with a stationary blade. The filtering drum has end plates which close off the drum and has seals between the end plates and external suction pipes and shafts. Such seals are positioned between two components, one of which moves relative to another. This results in leakage and/or short seal life. Further, the filtering drums heretofore employed have been frequently difficult to service because of the time to separate the filtering drum from the related components and to remove the drum from the filter tank.

The present invention is directed to a filter system having a filtering drum assembly located in a filter tank. The drum assembly preferably has a vertically-disposed, stationary drum which has no seals located between moving or movable components. The drum assembly also can be quickly disconnected so as to be removed from the filter tank for service.

The filtering drum according to the invention has upper and lower plates which close off the drum and a suction pipe is affixed to the lower plate, both the pipe and drum plate being stationary with no flexible seal at all therebetween. The upper plate has a central receptacle which completely closes off the drum interior from the exterior, with the receptacle rotatably receiving a drive shaft. A wiper arm and blade are driven by the shaft periodically and move around the periphery of the stationary drum to clean the filter cake therefrom.

The filtering drum assembly, which includes the drum with its suction pipe and the wiper blade with its drive mechanism, can be easily removed from the tank as a unit, simply by disconnecting the suction pipe and a supply line for pressurized fluid for the drive mechanism.

It is, therefore, a principal object of the invention to provide an improved filtering drum assembly for a filter system.

Another object of the invention is to provide a vertically-disposed filtering drum which is stationary, and around the periphery of which a wiper blade is periodically moved by drive mechanism located above the drum.

A further object of the invention is to provide a filtering drum having no seals between moving or movable components.

Yet another object of the invention is to provide a filtering drum assembly which can be quickly and easily removed from a filter tank for service.

Many other objects and advantages of the invention will be apparent from the following detailed description of a preferred embodiment thereof, reference being made to the accompanying drawings, in which.

Figure 1:
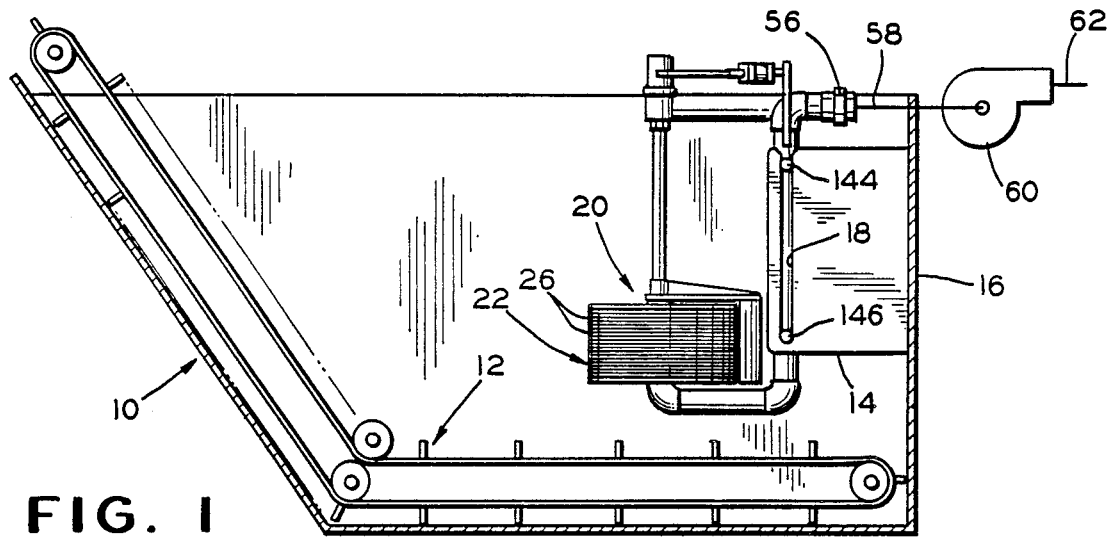
FIG. 1 is an enlarged schematic view in vertical cross section taken through a filter tank and showing a filtering drum assembly in side elevation.

Referring to the drawings, and particularly to FIG. 1, a filter tank 10 holds contaminated liquid, commonly cutting fluid or cooling fluid used in metal-working machines. A suitable belt conveyor 12 is located in the bottom of the tank and carries off contaminants received from the liquid in the tank. A pair of mounting plates 14 are affixed to a wall 16 of the tank 10 and have elongate openings 18 in the form of slots to receive a filter drum assembly indicated at 20.

Figure 3:
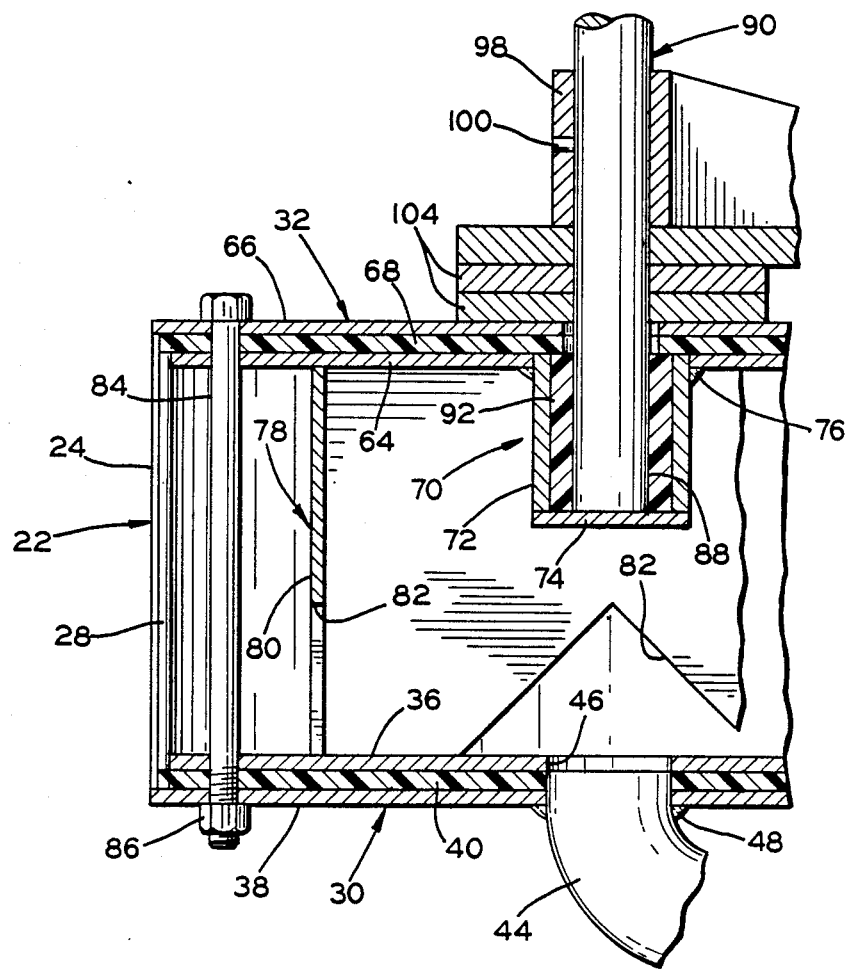
FIG. 3 is a further enlarged, fragmentary view in vertical cross section of a filtering drum assembly.

The filtering drum assembly 20 includes a filtering drum 22 preferably of a wedge-wire type which is commercially available and is known in the art. The filtering drum 22 has a cylindrical filter wall 24 formed of a spiral of closely-spaced turns of wire 26 of wedge-shape configuration in transverse cross section. The wire 26 is spaced apart from 0.005 to 0.020 inches, with the spacing increasing toward the interior of the drum so that contaminants will not easily become wedged between the turns of wire. The wire 26 is held in spaced relationship by rod ribs 28 (FIG. 3) which are circumferentially spaced around the drum wall 24 and are suitably affixed to the wire. The details of the drum wall 24 do not form part of the instant invention.

The lower and upper ends of the drum 22 are closed off by lower and upper plate assemblies 30 and 32. The lower plate assembly 30 includes a lower inner metal plate 36, a lower outer metal plate 38, and a gasket 40 therebetween. The inner plate 36 has a diameter which is slightly smaller than the diametrical spacing across the rod ribs 28 and the gasket 40 is notched to receive the ends of the ribs 28. The diameter of the outer plate 38 substantially equals the outer diameter of the drum wall 24.

A suction pipe 42 communicates with the interior of the drum 22. Toward this purpose, the suction pipe has an end elbow 44 which extends into a central opening 46 in the lower plate assembly 30 and is welded or otherwise affixed to the lower outer plate 38 by weld metal 48. Both the drum 22 and the suction pipe 42 are stationary so that the simple weld metal 48 provides an effective seal between the suction pipe and the drum interior without any additional seals being required. Previous filtering drums had rotational or sliding movement between the suction pipe and the drum, requiring special seals which had a tendency to leak and had a short life.

The suction pipe 42 further has a short horizontal section 50 (FIG. 2), a vertical section 52 and an upper elbow 54 connected to a fitting or union 56. This provides a generally J-shaped configuration for the suction pipe 42 which also provides support for the drum 22. Referring to FIG. 1, the union 56 is connected to an inlet line 58 of a suction pump 60 having an outlet line 62 which can communicate with a reservoir and with metal-working machines to which the filtered liquid is supplied.

The upper plate assembly 32 includes an upper inner metal plate 64 (FIG. 3), an upper outer metal plate 66, and a gasket 68 therebetween. These have outer diameters and configurations similar to the corresponding plates of the lower plate assembly 30. A recptacle or cup 70 is formed by a cylindrical wall 72 and an end wall 74 with the wall 72 being affixed to the upper inner plate 64 by weld metal 76. Thus, the interior of the receptacle 70 is completely closed off from the interior of the drum 22 without requiring any flexible seals.

A square box spacer 78 is located around the receptacle 70 and extends between the lower and upper inner plates 36 and 64. More specifically, the box spacer has side walls 80 with lower, large notches 82 through which filtered liquid can pass from the drum wall 24 to the suction pipe elbow 44. The lower edges of the side walls 80 of the box spacer 78 can be affixed, as by welds, to the lower inner plate 36. The lower and upper plate assemblies 30 and 32 are connected by long bolts 84 and nuts 86. When the nuts 86 are tightened, the bolts 84 are placed in tension and, through the box spacer 78, the inner and outer plates 36, 38 and 64, 66 place the gaskets 40 and 68 in compression.

Figure 4:
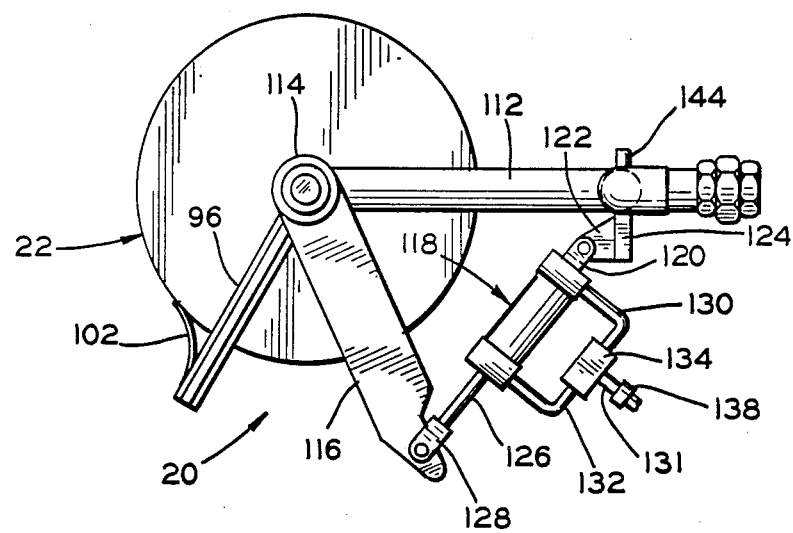
FIG. 4 is a somewhat schematic top view of the filter assembly of FIG. 2.

A lower end 88 of a drive shaft 90 extends into the receptacle 70 and is rotatably received in a commercially-available sleeve bearing 92. A wiper assembly 94 is located above the filtering drum 22 and includes a wiper arm 96 which is longer than the radius of the drum 22 and is affixed to the drive shaft 90 by a sleeve 98 having a pin or setscrew 100. A wiper blade 102 extends downwardly from the outer end of the arm 96. The blade 102 is made of spring steel and presses tightly against the outer surface of the drum wall 24, as best shown in FIG. 4. The wiper arm 96 is rotated clockwise, so that the wiper blade 102 scrapes the filter cake off the outer surface of the drum wall 24 in the manner of a snow plow. The filter cake falls onto the conveyor 12, which moves continuously, and is carried out of the tank 10. Two wear pads 104 are located between the wiper arm 96 and the upper plate 66.

Figure 2:
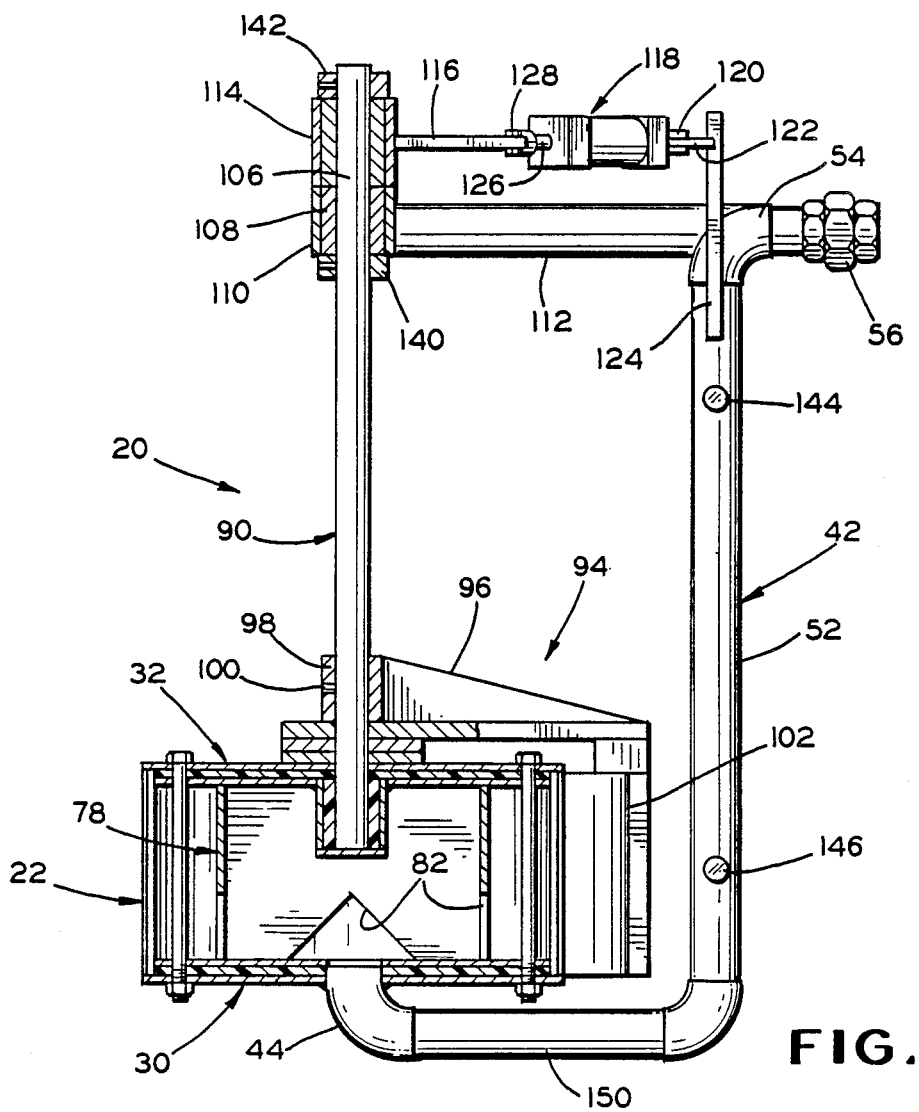
FIG. 2 is an enlarged view in vertical section of the filtering drum assembly of FIG. 1.

Referring to FIG. 2, an upper end portion 106 of the drive shaft 90 extends through an upper sleeve bearing 108 which is held by a retaining sleeve 110. The sleeve 110 is affixed to a supporting arm 112 which, in turn, is affixed to the elbow 54 of the suction pipe 42. The sleeve bearing 108, as well as the lower sleeve bearing 92, can be coated with a slippery plastic and are commercially available.

A commercially-available one-way clutch 114 (FIGS. 2 and 4) is located on the upper end portion 106 of the drive shaft 90 above the bearing 108 and the sleeve 110. A drive arm 116 is affixed to and extends outwardly from the one-way clutch 114 and is driven by a fluid-operated ram 118. The ram has a clevis 120 pivotally connected to a bracket 122 which is affixed to a bar 124. The bar 124, in turn, is affixed to the suction pipe 42. The ram 118 also has a piston rod 126 extending therefrom and pivotally connected by a clevis 128 to the outer end of the drive arm 116. Fluid under pressure is supplied to the blind and rod ends of the ram 118 by lines 130 and 132 which extend from a three-way valve 134 to which fluid under pressure is supplied from a suitable source by a line 136 having a coupling 138. From the valve, the fluid is alternately supplied to the blind and rod ends of the ram to extend and retract the piston rod 126. When the piston rod 126 extends, the arm 116 is driven in a clockwise direction and likewise moves the wiper arm 96 and the blade 102 in a clockwise direction through the drive shaft 90. When the piston rod 126 retracts, the drive shaft 90 remains stationary so that the wiper blade 102 is incrementally advanced relative to the drum wall 24 each time the piston rod 126 extends and retracts through one cycle. The cycle for the pneumatic ram 118 can be initiated by a timer or by a pressure sensor with senses the pressure differential across the drum wall 24. The pressure increases to a predetermined value as the filter cake builds up. Lower and upper collars 140 and 142 (FIG. 2) are pinned or otherwise suitably affixed to the drive shaft 90 to hold the shaft 90 against longitudinal movement.

The straight section 52 of the suction pipe 42 has two diametrically-opposite upper supporting pins 144 and lower supporting pins 146 affixed thereto. These are received in the plate openings 18 (FIG. 1) to hold the filter assembly 20 in position in the tank, with the lower pins 146 in lower ends of the openings 18. The filter assembly 20 can be readily removed from the tank 10 for service, repair, or replacement simply by disconnecting the union 56 for the suction pipe 42 and the coupling 138 for the fluid-operated ram supply, and then simply lifting out the filtering assembly by means of the supporting arm 112.

As discussed above, there are no flexible seals at all between components which move or arm movable relative to one another. This virtually eliminates leaks and short seal life due to wear heretofore commonly encountered. Also, the filtering drum 22, the suction pipe 42, the drive shaft 90, and the drive mechanism can all quickly be readily removed from the tank 10 as a unit.

Various modifications of the above-described embodiment of the invention will be apparent to those skilled in the art, and it is to be understood that such modifications can be made without departing from the scope of the invention, if they are made within the spirit and the tenor of the accompanying claims.

We claim:

1. A filtering system for filtering contaminants from a liquid, said system comprising a tank, a conveyor in the bottom of said tank for receiving contaminants and for conveying contaminants from said tank, mounting means in said tank, and a filter drum assembly comprising a filtering drum in said tank having a vertical axis, said drum having upper plate means closing off an upper end of said drum and lower plate means closing off a lower end of said drum, a suction pipe affixed to said lower plate means and communicating with the interior of said filtering drum, said suction pipe having means cooperating with said mounting means for supporting said pipe and said drum by said mounting means, a substantially vertical drive shaft, lower bearing means held by said upper plate means and rotatably receiving a lower end of said shaft, a wiper arm affixed to said shaft above said upper plate means, a wiper affixed to an outer end portion of said wiper arm and extending downwardly and into contact with an outer surface of said filtering drum, upper bearing means rotatably engaging an upper portion of said shaft, a supporting arm affixed to said upper bearing means, said supporting arm being supported by said suction pipe, drive means for rotating said drive shaft and said wiper arm, and means for removably connecting said suction pipe to a suction pump.

2. A filtering system according to claim 1 wherein said lower bearing means is located in a receptacle affixed to said upper plate means.

3. A filtering system according to claim 1 wherein said upper plate means comprises an outer plate, an inner plate, and gasket means therebetween, said lower plate means comprises an outer plate, an inner plate, and gasket means therebetween, and means connecting said outer plates and holding said plate means in position relative to said filtering drum.

4. A filtering system according to claim 3 wherein said suction pipe is affixed to said outer plate of said lower plate means.

5. A filtering system according to claim 1 wherein said mounting means in said tank comprises two plates supported in said tank and having openings therein, and said cooperating means of said suction pipe being projections extending from said pipe into said openings.

6. A filtering system according to claim 5 wherein said plate openings are slots and said projections are separable from said slots to enable said filtering drum assembly to be removed from said tank as a unit.

7. A filtering system for filtering contaminants from a liquid, said system comprising a tank, means in said tank for receiving contaminants and for removing the contaminants from said tank, mounting means in said tank, and a filter drum assembly comprising a filtering drum in said tank, a suction pipe supporting said drum and communicating with the interior of said drum, said suction pipe having means cooperating with said mounting means for supporting said pipe and said drum by said mounting means, a drive shaft, a wiper arm affixed to said shaft, a wiper affixed to said wiper arm and extending into contact with an outer surface of said filtering drum, bearing means rotatably engaging a portion of said drive shaft, a supporting arm affixed to said bearing means and supported by said suction pipe, drive means for rotating said drive shaft and said wiper arm and supported by said suction pipe, and means for removably connecting said suction pipe to a suction pump.

8. A filtering system according to claim 7 wherein said mounting means includes openings and said cooperating means includes projections which are removably received in said openings, whereby said filter drum assembly can be removed as a unit from said tank.

9. A filter drum assembly comprising a filtering drum having a vertical axis, said drum having upper plate means closing off an upper end of said drum and lower plate means closing off a lower end of said drum, a suction pipe having an end affixed to said lower plate means and communicating with the interior of said drum, a substantially vertical drive shaft, lower bearing means held by said upper plate means and rotatably receiving a lower end of said shaft, a wiper arm affixed to said shaft above said upper plate means, a wiper affixed to an outer end portion of said wiper arm and extending downwardly into contact with an outer surface of said filtering drum, upper bearing means rotatably engaging an upper portion of said drive shaft, a supporting arm affixed to said upper bearing means, and drive means connected with an upper portion of said drive shaft for rotating said drive shaft and said wiper arm.

10. A filter drum assembly according to claim 9 wherein said upper plate means has a receptacle affixed thereto in which said lower bearing means is located.

11. A filter drum assembly according to claim 9 wherein said supporting arm is affixed to said suction pipe.

12. A filter drum assembly according to claim 9 wherein said drive means includes fluid-operated means supported by said suction pipe.

13. A filter drum assembly according to claim 9 wherein said upper plate means comprises an outer plate, an inner plate, and gasket means therebetween, said lower plate means comprises an outer plate, an inner plate, and gasket means therebetween, and means connecting said outer plates and holding said plate means in position relative to said filtering drum.

14. A filter drum assembly according to claim 13 wherein an end of said suction pipe is affixed to said lower outer plate.

15. A filter drum assembly according to claim 13 wherein a receptacle for said lower bearing means is affixed to said upper outer plate.

16. A filter drum assembly according to claim 9 wherein said drive means comprises a one-way clutch affixed to an upper portion of said drive shaft, a drive arm extending outwardly from said one-way clutch, and fluid-operated means for reciprocating said drive arm.

17. A filter drum assembly according to claim 16 wherein a fluid supply line supplies fluid to said fluid-operated means, said fluid supply line having a removable coupling to enable said line to be disconnected from said fluid-operated means.

18. A filter drum assembly according to claim 17 wherein said suction pipe has a separable coupling for connecting said suction pipe to a suction pump.

* * * * *